(12) United States Patent
Volpe, Jr. et al.

(10) Patent No.: US 7,966,950 B2
(45) Date of Patent: Jun. 28, 2011

(54) VEHICLE REAR SEAT SHELF

(76) Inventors: Joseph Volpe, Jr., Sarasota, FL (US); William Chynoweth, Troy, MI (US)

( * ) Notice: Subject to any disclaimer, the term of this patent is extended or adjusted under 35 U.S.C. 154(b) by 353 days.

(21) Appl. No.: 12/115,604

(22) Filed: May 6, 2008

(65) Prior Publication Data

US 2009/0277358 A1 Nov. 12, 2009

(51) Int. Cl.
*A47B 31/06* (2006.01)
*A47B 3/00* (2006.01)
*A47B 3/083* (2006.01)
(52) U.S. Cl. ............................ 108/44; 108/115; 108/169
(58) Field of Classification Search .................... 108/42, 108/44, 47, 48, 144.11, 146, 147.19–147.21, 108/166–170
See application file for complete search history.

(56) References Cited

U.S. PATENT DOCUMENTS

| | | | | |
|---|---|---|---|---|
| 1,263,122 A * | 4/1918 | Sandstrom | | 108/1 |
| 1,644,818 A * | 10/1927 | Converse | | 108/129 |
| 1,833,728 A * | 11/1931 | Townsend et al. | | 108/125 |
| 1,913,418 A * | 6/1933 | Wallinder | | 108/131 |
| 2,406,237 A * | 8/1946 | Milkoff | | 190/11 |
| 2,529,789 A * | 11/1950 | Simon | | 108/25 |
| 2,650,374 A * | 9/1953 | Pierce | | 5/94 |
| 2,707,840 A * | 5/1955 | Doyle | | 108/13 |
| D193,389 S * | 8/1962 | Kardach | | D6/333 |
| 3,063,064 A * | 11/1962 | Mace | | 5/94 |
| 3,244,125 A * | 4/1966 | Mackey | | 108/25 |
| 4,494,465 A * | 1/1985 | Fick, Jr. | | 108/44 |
| 4,505,408 A * | 3/1985 | Sagol | | 222/185.1 |
| 4,909,159 A * | 3/1990 | Gonsoulin | | 108/44 |
| 4,943,105 A | 7/1990 | Kacar et al. | | |
| 5,487,361 A | 1/1996 | Dean | | |
| 5,730,066 A * | 3/1998 | Auten et al. | | 108/44 |
| 5,788,575 A * | 8/1998 | Fluster | | 248/463 |
| 6,125,772 A * | 10/2000 | Clements | | 108/129 |
| 7,398,737 B1 * | 7/2008 | Martellaro | | 108/44 |
| 2007/0272128 A1 * | 11/2007 | Lin | | 108/115 |

* cited by examiner

*Primary Examiner* — Darnell M Jayne
*Assistant Examiner* — Timothy M Ayres

(57) ABSTRACT

A shelf assembly is for carrying goods on a rear seat of a vehicle. The shelf assembly includes a base, a pair of front legs, and a pair rear legs. The base includes a first and a second section. The base, which is for resting on the rear seat, has a front and a rear portion opposing the front portion. The rear legs extend from the rear portion of the sections of the base for supporting the base on the rear seat of the vehicle. A section hinge pivotally connects the first section and the second for folding the first section relative to the second section at the section hinge. A pair of front legs and a pair of rear legs are adapted to extend from the front portion of the sections of the base to support the base on a floor of the vehicle.

18 Claims, 2 Drawing Sheets

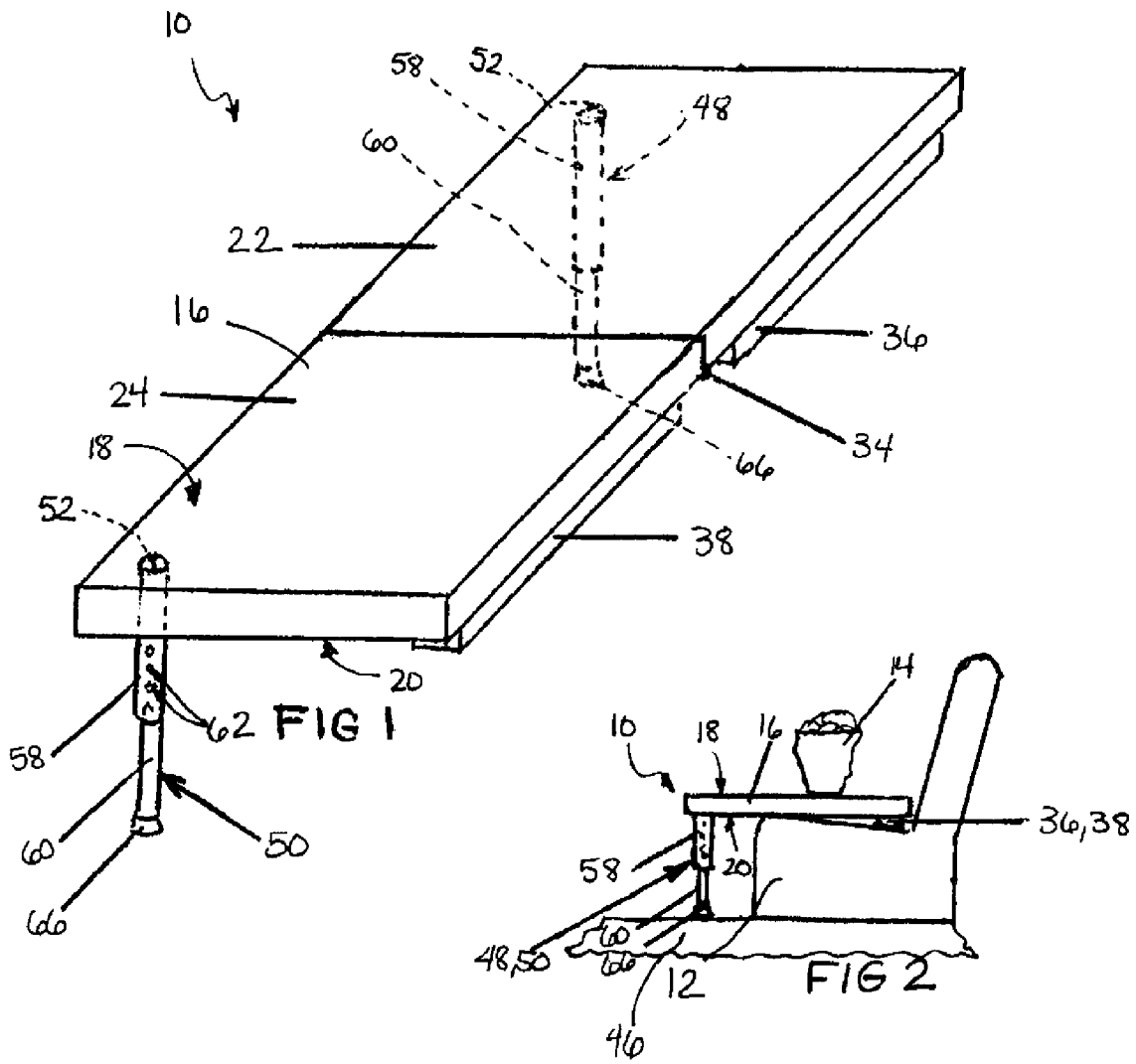

VEHICLE REAR SEAT SHELF

BACKGROUND OF THE INVENTION

1. Field of Invention

This invention relates to a portable shelf for holding goods, specifically designed to fit behind the front seat and on the rear seat and when not in use, be able to fold up and be stored in the vehicle.

2. Description of the Related Art

Many individuals use the rear seats of vehicles for carrying items such as goods, packages, luggage, clothes, loose pets, and pets in cages that, for various reasons, the individuals do not want to put in storage in another area of the vehicle, i.e., a trunk or other cargo area. When these items are placed on the rear seats, a sudden stop of the vehicle tends to allow these items to slide forward and to fall off the seat, creating an undesirable distraction to the driver or possible damage or injury to the items. Additionally, the rear seats of the vehicles are sloped and otherwise undulated. As a result, the seats are susceptible to being damaged by carrying these items or can damage the items themselves. The problems with transporting items on the rear seats has been addressed in the prior art with varying success.

A seat system for carrying items on a rear seat is disclosed in U.S. Pat. No. 5,487,361 to Dean (the '361 patent). The seat system of the '361 patent discloses a rectangular base having a planar surface for placement over the rear seat of the vehicle. A pair of legs are removably attached to an underside of the rectangular base for resting on a floor of the vehicle to support the base and prevent the base from tipping forward, off of the rear seat when items are loaded onto the seat during transportation.

Another seat system for carrying items on the rear seat is disclosed in U.S. Pat. No. 4,943,105 to Kacar et al. (the '105 patent). The seat system disclosed in the '105 patent includes a base having a planar surface for placement over the rear seat of the vehicle and a pair of sides extending from the base. One of the other sides is for extending up a back of the rear seat and the other side is for extending up a rear of the front seats and fastened to a head rest on the front seats for preventing the seat system from tipping forward off of the rear seat. However, while the seat system is prevented from tipping off of the front of the rear seat, the items are not prevented sliding or rolling rearward, toward the back of the rear seat.

Various vehicles having varying distances between the front edge of the rear seat and the floor of the vehicle, varying depths of the rear seats, varying slopes of the rear seats, varying heights between the floor of the vehicle and the headrests (or no headrests at all).

Other seat systems in the prior art have included shelves in a rear storage area, such as that found in SUV's and Vans. These seat systems do not address the area between the front seat and the rear seat, but instead concentrate on providing a shelf in the storage area behind all of the seats.

The plywood shelf in our experimentation ended angled down, front to rear, approximately 1.5 inches in a length of 18 inches, due to the slope for passenger comfort built into vehicle seats. Prior art does not appear to address this problem. U.S. Pat. No. 5,487,361, drawing appears to show the seat to be flat which does not correlate to our studies of actual car seats in use at the present time. This angle continues forward since the planned shelf area goes forward another 6 inches thus leaving a sloped shelf as a problem.

The prior art fails to disclose a seat system which is adjustable to fit a variety of vehicles while also leveling the base, corresponding with the rear seat itself, to compensate for the angle of the seat with respect to the floor of the vehicle to provide a seat system which is level with respect to the floor of the vehicle.

SUMMARY OF THE INVENTION AND ADVANTAGES

A shelf assembly is for carrying goods on a rear seat of a vehicle. The shelf includes a base and a rear leg. The base is for resting on the rear seat. The base has a front portion and a rear portion opposing the front portion. The rear leg extends from the rear portion of the base for supporting the base on the rear seat of the vehicle.

A shelf assembly is for supporting articles on a rear seat of a vehicle. The shelf assembly includes a first section and a second section. The first section has a first edge. The second section has a second edge. The second edge is disposed adjacent the first edge. The first and second sections each have a top side and a bottom side. The bottom sides are disposed opposite the top sides. A section hinge is pivotally connecting the first section, at the first edge, and the second section, at the second edge, for folding the first section relative to the second section at the section hinge. A pair of front legs are adapted to extend from the bottom side of the sections. A pair of rear legs are adapted to extend from the bottom side of the sections.

A shelf assembly is for supporting articles on a rear seat of a vehicle. The shelf assembly includes a base for supporting the articles. A first member extends from the base. A second member extends to an end. The second member is in telescoping engagement with the first member for adjusting a length, as defined between the base and the end when the second member is in telescoping engagement with the end. The base defines a front pocket for receiving the first and second members. A front hinge pivotally connects the first member and the base within the front pocket for allowing the first member to pivot about the hinge from an extended position to a retracted position with all of the first and second members received within the front pocket in the retracted position.

The vehicle seat shelf is a shelf designed to fit on the rear seat of vehicles to provide an expanded and convenient way to carry goods in this area. It is completely self-contained in that it allows for the ability to be adjusted and work with various height seats and has a built in feature to allow it to end up level on the slope seats in vehicles. When not in use it self stores the above features and folds in half to a size that will take minimal space in the storage area or trunk of a car. Accordingly, the two-piece and hinged shelf is light-weight, yet strong.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a perspective view of a vehicle seat shelf as it would be used in on the vehicle seat;

FIG. 2 is a side view showing the vehicle seat shelf disposed on the rear seat with an adjustable leg and a leveling block;

DETAILED DESCRIPTION OF THE INVENTION

Referring to the Figures, wherein like numerals indicate corresponding parts throughout the several views, a shelf assembly is shown generally at 10 in FIG. 1. The shelf assembly 10 is for placement across a rear seat 12 of a vehicle to support articles 14, such as pets, groceries, etc., as shown in FIG. 2.

Figure 4:
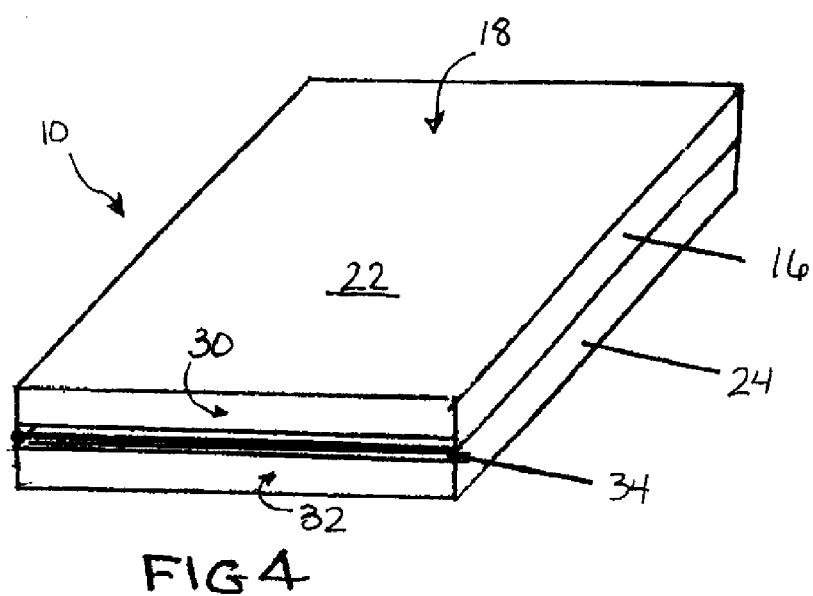
FIG. 4 shows the shelf in the folded stored position.

The assembly includes a base 16 for resting on the rear seat 12 to support the articles 14. The base 16 has a top side 18 and a bottom side 20. The articles 14 are placed on the top side 18 of the base 16 when the shelf assembly 10 is in use. The base 16 includes a first section 22 and a second section 24. The base 16 has a front portion 26 and a rear portion 28 that opposes the front portion 26. The base 16 is formed from plastic, such as blow molded plastic that is filled with high density foam. This would provide a strong base 16 that is also lightweight. However, it should be appreciated that other suitable materials known to those skilled in that art may also be used. The top side 18 of the base 16 may be molded with non-skid pattern, or coated with a non-skid material, to provide better gripping for the articles 14 stored on the top side 18 of the base 16. When the assembly is resting on the rear seat 12 of the vehicle, the front portion 26 is closest to a front of the vehicle and the rear portion 28 is closest to a rear of the vehicle. The first section 22 of the base 16 has a first edge 30 and the second section 24 of the base 16 has a second edge 32. The first edge 30 is disposed adjacent the second edge 32 such that the first edge 30 is parallel the second edge 32. A section hinge 34 interconnects the first and second sections 24, along the respective edges, for allowing the first section 22 to fold about the section hinge 34 onto the second section 24 to collapse the assembly for storage when not in use, as shown in FIG. 4. The section hinge 34 may be formed integral to the base 16, i.e., a living hinge, or attached to the base 16 with fasteners or an adhesive. It should be appreciated that the section hinge 34 is not limited to that described herein, but may be any type of hinge known to those skilled in the art.

Figure 3:
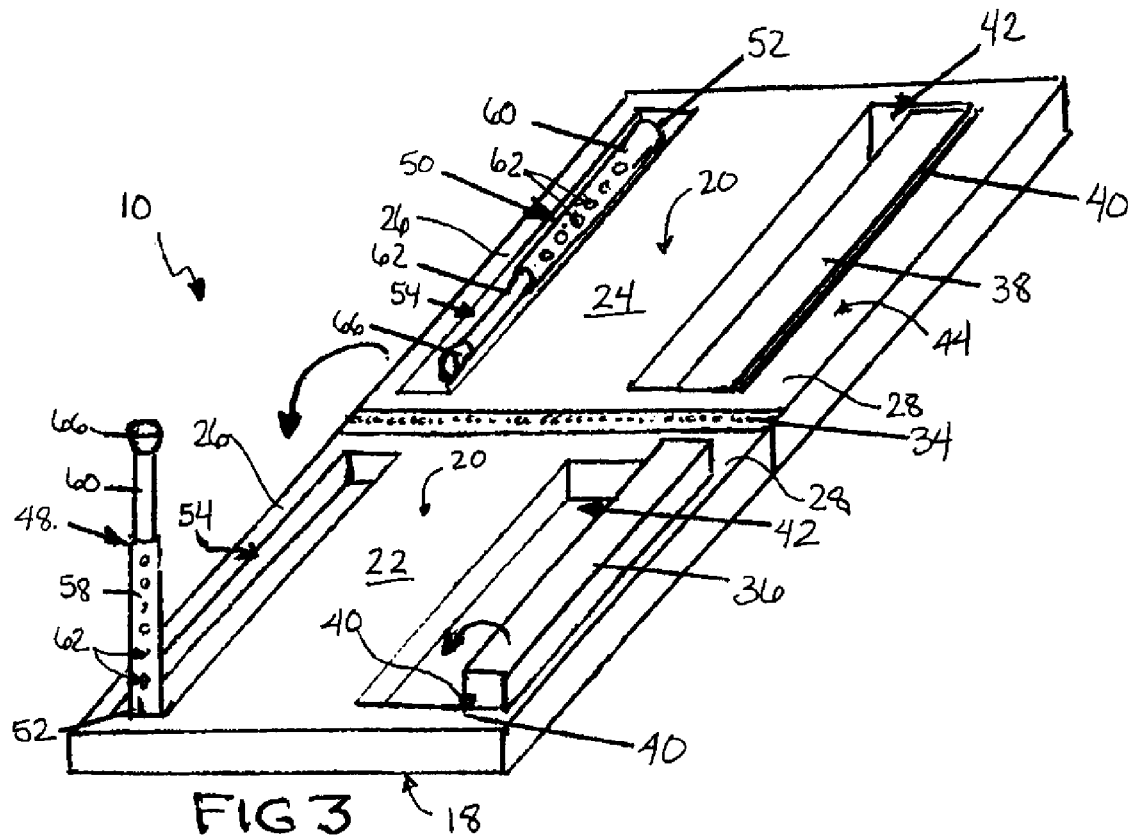
FIG. 3 is a perspective view of the bottom of the vehicle seat shelf showing one leg and one leveling block in an in-use position and another leg in a stored position.

A pair of rear legs 36, 38 extend from the bottom side 20 of the base 16 at the rear portion 28 for supporting the base 16 on the rear seat 12 of the vehicle. Each of the rear legs 36, 38 may be shaped as block for leveling the base 16 with respect to the rear sear 12 of the vehicle. It should be appreciated, however, that the shape of the rear legs 36, 38 is not limited to being a block, but may be any other shape known to those skilled in the art. In a preferred embodiment, a rear leg 36, 38 extends from each of the sections 22, 24 of the base 16. It should be appreciated, however, that more or less rear legs 36, 38 may be used. Each of the rear legs 36, 38 are pivotally connected to the base 16 by a rear hinge 40. The base 16 defines a pair of rear pockets 42. One of the rear pockets 42 is defined in one of the sections 22, 24 for receiving and storing the corresponding rear leg 36, 38. The base 16 also includes a rear support surface 44. Referring to FIG. 3, the rear support surface 44 is for supporting the rear leg 36, 38 when the rear leg 36, 38 is removed from the rear pocket 42 and in an extended position for supporting the base 16 on the rear seat 12 of the vehicle to level the base 16 relative to a floor 46 of the vehicle. The rear pocket 42 is defined adjacent the rear support surface 44 for receiving the rear leg 36, 38 when the rear leg 36, 38 is pivoted about the rear hinge 40, away from the rear support surface 44, and into the rear pocket 42. Therefore, the rear leg 36, 38 is movable between a stowed position, i.e., with the rear leg 36, 38 inside the rear pocket 42, and an extended position, i.e., with the rear leg 36, 38 resting against the rear support surface 44. It should be appreciated, however, that rear legs 36, 38 may also be removably connected to the rear support surface 44, i.e., fastened, etc., such that pivoting about the rear hinge 40 is not required. In this embodiment, when the rear legs 36, 38 are to be stowed in the rear pockets 42, the rear legs 36, 38 are removed from the rear support surface 44 and placed into their respective rear pockets 42.

A pair of front legs 48, 50 extend from the bottom side 20 of the base 16 at the front portion 26 for resting the front leg 48, 50 on the floor 46 of the vehicle, adjacent the rear seat 12, while the rear legs 36, 38 rest on the rear seat 12 of the vehicle, to support the base 16 on the floor 46 of the vehicle. In a preferred embodiment, one of the front legs 48, 50 extends from a corresponding one of the sections 22, 24 of the base 16. The front legs 48, 50 and the base 16 are pivotally connected by a front hinge 52. It should be appreciated, however, that in an alternative embodiment, the front legs 48, 50 are removably attached to the base 16, i.e., fastened, screwed into the base 16, etc. The base 16 defines a pair of front pockets 54. One of the front pockets 54 is defined in one of the sections 22, 24 for receiving and storing the corresponding front leg 48, 50. The front legs 48, 50 are pivotally attached to the base 16 inside of the respective front pocket. This allows the front legs 48, 50 to pivot out of the front pockets 54 to an extended position and allows the front legs 48, 50 to pivot from the extended position and into the front pockets 54 to a stowed position. In one embodiment, a locking mechanism (not shown) or other feature known to those skilled in the art is used to keep the front legs 48, 50 in the extended position for use, while also allowing the front legs 48, 50 to be retracted into the stowed position when not in use.

When the front legs 48, 50 and the rear legs 36, 38 are in the extended position, the front legs 48, 50 extend a greater distance from the base 16 than the rear legs 36, 38. This means that the front legs 48, 50 are longer than the rear legs 36, 38. The front legs 48, 50 include a first member 58 and a second member 60 removably attached to the first member 58. The first member 58 defines a hollow interior (not shown) and the second member 60 extends into the hollow interior such that the first and second members 60 telescope relative to one another. In one embodiment, the first members 58 each define a plurality of thru-holes 62. A fastener, such as a spring-loaded mechanism (not shown), is disposed on each of the second members 60 for adjustment of the second member 60 relative to the first member 58. When the spring-loaded mechanism is depressed, the second member 60 is moveable within the first member 58 until the spring-loaded mechanism 64 is aligned with the thru-hole 62 corresponding to the desired length of the front legs 48, 50. It should be appreciated, however, that other configurations known to those skilled in the art may also be used. Therefore, as the second member 60 telescopes relative to the first member 58, the fastener affixes the position of the second member 60 relative to the first member 58 to set the length of the front legs 48, 50 for use in the vehicle. To provide gripping between the front legs 48, 50 and the floor 46 of the vehicle, rubber feet 66 are disposed on each of the front legs 48, 50.

As discussed above, the section hinge 34 pivotally connects the first section 22 at the first edge 30, proximate the bottom side 20, and the second section 24 at the second edge 32, proximate the bottom side 20. As the sections 22, 24 are pivoted, or folded, about the section hinge 34, the bottom side 20 of the first section 22 faces the bottom side 20 of the second section 24, for storage of the vehicle seat shelf. The placement of the section hinge 34 proximate the bottom side 20 of the base 16 prevents the base 16 from accidentally folding about the section hinge 34 when items are placed on the top side 18 of the base 16 during use inside of the vehicle. Additionally, because the bottom side 20 of the sections 22, 24 are brought together, the front legs 48, 50 and the rear legs 36, 38 become trapped between the sides 20 for storage, as illustrated in FIG. 4. In one embodiment, a latch is provided to keep the base 16 folded.

Many modifications and variations of the present invention are possible in light of the above teachings. In addition, the reference numerals in the claims are merely for convenience and are not to be read in any way as limiting.

What is claimed is:

1. A shelf assembly for carrying goods on a rear seat of a vehicle comprising:
a base configured for resting on the rear seat such that said base is supported by the rear seat to support the goods thereon;
wherein said base includes a front portion and a rear portion opposing said front portion;
wherein said base includes a top side and a bottom side having a rear support surface;
wherein said bottom side of said base defines a rear pocket adjacent said rear support surface;
a rear leg pivotally extending from said rear support surface of said bottom side of said rear portion of said base such that said rear leg rotates 180 degrees between an extended position and a retracted position;
wherein said rear leg supports said rear support surface and supports said base on the rear seat of the vehicle when said rear leg is in said extended position; a front leg extending from said front portion of said base for resting said front leg on a floor of the vehicle while said rear leg rests on the rear seat of said vehicle;
wherein said rear leg is disposed within said rear pocket such that said rear leg is substantially flush with said rear support surface when said rear leg is in said retracted position.

2. A shelf assembly, as set forth in claim 1, further comprising a hinge pivotally connecting said base and said rear leg.

3. A shelf assembly, as set forth in claim 1, wherein said rear leg is further defined as a pair of rear legs.

4. A shelf assembly, as set forth in claim 1, wherein said front leg is further defined as extending a greater distance from said base than said rear leg.

5. A shelf assembly, as set forth in claim 3, wherein said front leg is further defined as including a first member and a second member removably attached to said first member.

6. A shelf assembly, as set forth in claim 5, wherein said first member defines a hollow interior for receiving said second member.

7. A shelf assembly, as set forth in claim 6, further comprising a fastener attaching said second member to said first member.

8. A shelf assembly, as set forth in claim 5, wherein said second member is further defined as being adjustably attached relative to said first member for varying the length of said front leg.

9. A shelf assembly, as set forth in claim 3, further comprising a front hinge pivotally connecting said front leg and said base.

10. A shelf assembly, as set forth in claim 3, wherein said front leg is further defined as a pair of front legs.

11. A shelf assembly, as set forth in claim 1, wherein said base is further defined as a first section and a second section with each section having a top side and a bottom side, opposing said top side, and with said rear leg extending from said bottom side of one of said section and a section hinge pivotally connecting said first base section and said second base section along said bottom side for folding said base.

12. A shelf assembly for supporting articles on a rear seat of a vehicle, said shelf assembly comprising:
a first section having a first edge;
a second section having a second edge with said second edge disposed adjacent said first edge;
wherein said first and second sections are supported by the rear seat of the vehicle such that the first and second sections are supported by the rear seat of the vehicle to support articles thereon;
said first and second sections each having a top side and a bottom side with said bottom sides disposed opposite said top sides;
wherein said bottom side includes a rear support surface;
a section hinge pivotally connecting said first section at said first edge and said second section at said second edge for folding said first section relative to said second section at said section hinge;
a pair of front legs adapted to extend from said bottom side of said sections;
wherein said bottom side of said first and second sections defines a pair of rear pockets adjacent said rear support surface such that one of said rear pockets is defined in each of said first section and said second section;
a pair of rear legs pivotally extending from said rear support surface of said bottom side of each of said sections such that said rear legs rotate 180 degrees between an extended position and a retracted position;
wherein said rear legs support said rear support surface and support said base on the rear seat of the vehicle when said rear legs are in said extended position; and
wherein said rear legs are disposed within said rear pocket such that said rear legs are substantially flush with said rear support surface when said rear legs are in said retracted position.

13. A shelf assembly, as set forth in claim 12, further comprising a pair of front hinges with one of said front hinges pivotally connecting one of said front legs to one of said sections for pivoting each of said front legs between a retracted position and an extended position.

14. A shelf assembly, as set forth in claim 12, further comprising a pair of rear hinges with one of said rear hinges pivotally connecting one of said rear legs to one of said sections for pivoting each of said rear legs between a retracted position and an extended position.

15. A shelf assembly, as set forth in claim 12, wherein said bottom side of each of said sections define a front channel for receiving one of said front legs and said bottom side of each of said sections define a rear channel for receiving one of said rear legs.

16. A shelf assembly, as set forth in claim 12, wherein said section hinge is further defined as pivotally connecting said first section at said first edge proximate said bottom side and said second section at said second edge proximate said bottom side such that said bottom side of said first section faces said bottom side of said second section when said first section and said second section are folded about said section hinge.

17. A shelf assembly, as set forth in claim 12, wherein each of said front legs are further defined as having a length which is adjustable.

18. A shelf assembly, as set forth in claim 12, wherein each of said rear legs are shaped as a block configured for leveling said base on the rear seat when said rear legs are in said extended position.

* * * * *